*Window and other Blinds.*
3933 *S. Hebron,* *Buffalo, N.Y.*
REISSUED APR 26 1870
*Fig. I.* *Fig. III.* *Fig. II.*
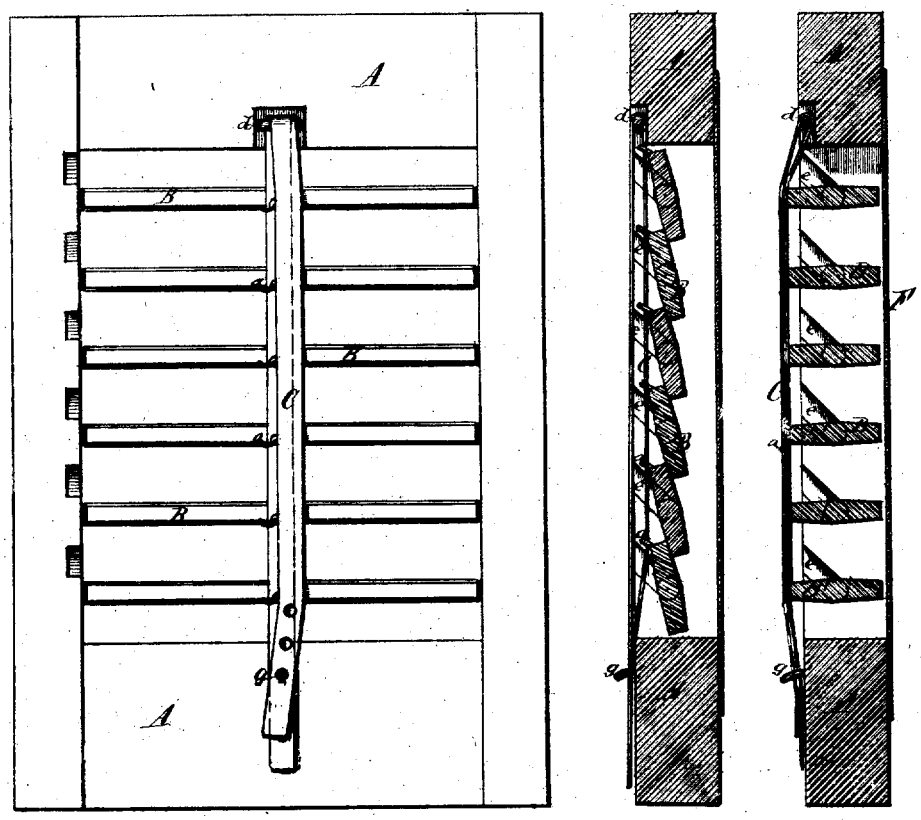
Edward Wiehelux
Jno. J. Bonner } Witnesses.
S. Hebron Inventor:
by Fobnsh & Keyall
Attys.

United States Patent Office.

STEPHEN HEBRON, OF BUFFALO, NEW YORK.

*Letters Patent No.* 94,599, *dated September* 7, 1869; *reissue No.* 3,933, *dated April* 26, 1870.

IMPROVEMENT IN WINDOW-BLINDS.

The Schedule referred to in these Letters Patent and making part of the same.

I, STEPHEN HEBRON, of the city of Buffalo, in the county of Erie and State of New York, have invented certain new and useful Improvements in Window and other Blinds, of which the following is a specification.

My invention consists—

First, in constructing the slats and frame of a window-blind, so that the former may be applied to or removed from the latter without disconnection of its parts, to secure facility in the repairing, cleaning, painting, &c.

Second, in the combination of a mosquito-bar with the frame of a window-blind, the slats of which are so connected that they may be readily removed when the blind is closed, and the mosquito-bar in use, to allow a more free and unobstructed entrance of the light when desired.

Third, the arrangement of a flexible strap attached to the removable slats of window or other blinds, and passing over a guide-rod, or, if preferred, a pulley, at the top of the frame.

Fourth, in driving the staples which attach the flexible strap to the slats in one corner of the slats, and at such an inclination to the sides of the latter as that the strap will lie straight and free on the slats, both when they are open and when they are closed, which would not be the case if the staples were inserted in the center of the edge of the slats, in the usual manner, in a line parallel with the sides thereof.

In the accompanying drawings—

Figure I is an inside elevation of my improved blind.

Figure II is a vertical section thereof, with the slats represented in an open position.

Figure III is a similar view, with the slats shown closed.

Like letters of reference designate like parts in each of the figures.

A is the frame of one section of a window-blind.

B B, the slats thereof.

C, the flexible strap.

*a a*, the staples by which it is secured to the slats, and

*d*, the bearing at the top of the frame, over which the strap passes in adjusting the slats.

*e e* are grooves in the inner edge of one of the stiles of the frame, inclined downward from the face of the stile, and opening into the holes forming the bearings for the slats at one end; the journals at the other end of the slats fitting in holes in the edge of the other stile in the ordinary manner.

F is the mosquito-bar, which is stretched across the blind on the outside, and secured to the frame thereof, either permanently or detachably.

Figs. II and III represent the slats pivoted near the inner side of the frame to prevent them from projecting outwardly against the mosquito-bar, which I apply to the outside of the blind, as they would, if pivoted at the center in the usual manner.

To form the connection of the strap C with the slats, I make perforations in the strap at the same distance apart as the slats, and, using common staples, drive them with one prong through said perforations into the corners of the edges of the slats in the oblique or inclined direction shown in the drawings.

This particular inclination of the staples is necessary in order to allow the strap to lie straight and free in whatever position the slats may be adjusted, it being evident that any other inclination of the staples would either prevent the full opening or the tight closing of the slats.

From the upper slat, the strap C passes over the guide-rod or pulley *d*, and descends to the lower cross bar of the frame, where I prefer to fasten both ends of the strap by forming holes therein and engaging them with a hook, *g*, projecting from the frame, or by any other suitable device.

By simply pulling on one or the other end of the strap, it is evident that the slats will be opened or closed as may be desired, while the fastening device just described will securely retain them in whatever position adjusted.

This method of operating slats is applicable to either outside or inside blinds, and whether the slats are vertical or horizontal.

Pivoting the slats so as to render them detachable from the frame enables the journals to be painted, and, consequently, protected from the influence of the weather, which, in the case of slats permanently secured in place, always rots the journals which cannot be painted, long before the other parts of the blind decay.

The detachability of the slats also allows the frame of the blind to be pinned and wedged together permanently, as it will never be necessary to take it apart to replace broken slats.

The flexible connection which the strap C affords, permits the slats to be all removed together, and compactly folded away in seasons when their use is not required. This is readily accomplished by withdrawing the strap from the guide-rod or pulley *d* and running the slats all together, after which they may be rolled into a compact bundle and secured by the strap for stowage until again wanted.

The thin strap takes up less room than the ordinary wooden rod, and permits the inward pivoting of the slats without interfering with the window-sash as a wooden rod would.

When the slats are so removed, the blind-frame may be kept closed, and thereby prevented from working loose from the fastenings commonly employed for holding them open and becoming damaged and annoying by slamming.

By my improved construction, the slats and netting may either or both be removed, according as circumstances require.

What I claim as my invention, is—

1. Window or other blinds having the slats made removable by means of the inclined grooves or their equivalent, substantially as and for the purpose hereinbefore set forth.

2. The combination of a mosquito-bar with the frame of a window or other blind, the slats of which are made removable, substantially as and for the purpose hereinbefore set forth.

3. The arrangement of the flexible strap C with the removable slats B and guide-bearing *d*, substantially as and for the purposes hereinbefore set forth.

4. The arrangement with the slats B and flexible strap *c* of the staples *a*, when inserted at the inclination with the face of the slats, as shown and described.

STEPHEN HEBRON.

Witnesses:
JAY HYATT.
M. A. ROBINSON.